(12) United States Patent
Raszga et al.

(10) Patent No.: US 9,750,203 B2
(45) Date of Patent: Sep. 5, 2017

(54) LOAD SENSE HYDRAULIC PUMP ALIGNMENT

(75) Inventors: Calin Raszga, Dubuque, IA (US);
Mark E. Breutzman, Tianjin (CN)

(73) Assignee: Deere & Company, Moline, IL (US)

( * ) Notice: Subject to any disclaimer, the term of this patent is extended or adjusted under 35 U.S.C. 154(b) by 1224 days.

(21) Appl. No.: 13/501,576

(22) PCT Filed: Oct. 12, 2009

(86) PCT No.: PCT/US2009/060346
§ 371 (c)(1),
(2), (4) Date: Jun. 29, 2012

(87) PCT Pub. No.: WO2011/046535
PCT Pub. Date: Apr. 21, 2011

(65) Prior Publication Data
US 2012/0255649 A1    Oct. 11, 2012

(51) Int. Cl.
*A01G 23/08* (2006.01)
*A01G 23/081* (2006.01)

(52) U.S. Cl.
CPC ........... *A01G 23/08* (2013.01); *A01G 23/081* (2013.01)

(58) Field of Classification Search
CPC .... A01G 23/08; A01G 23/081; A01G 23/083; A01G 23/087; A01G 23/085; F15B 2211/20553; F15B 2211/20546
USPC .......................................................... 60/452
See application file for complete search history.

(56) References Cited

U.S. PATENT DOCUMENTS

| | | | |
|---|---|---|---|
| 4,029,439 A | 6/1977 | Adams | |
| 4,039,010 A | 8/1977 | Tucek | |
| 4,412,569 A | 11/1983 | Barnett et al. | |
| 4,811,561 A | 3/1989 | Edwards et al. | |
| 4,881,582 A | 11/1989 | Ketonen | |
| 5,957,177 A * | 9/1999 | Smith et al. | 144/248.7 |
| 6,267,163 B1 * | 7/2001 | Holmes | A01G 23/081 144/336 |
| 6,516,841 B1 | 2/2003 | Oilund | |
| 6,691,752 B2 | 2/2004 | DiSabatino | |
| 6,962,178 B2 | 11/2005 | Duval | |
| 7,296,602 B1 | 11/2007 | Riha et al. | |
| 7,415,822 B1 | 8/2008 | Harber et al. | |
| 2004/0020561 A1 | 2/2004 | Brown | |
| 2005/0067239 A1 * | 3/2005 | Bauer et al. | 188/297 |
| 2007/0125078 A1 | 6/2007 | Tanaka et al. | |
| 2008/0289724 A1 | 11/2008 | Sharplin et al. | |

OTHER PUBLICATIONS

Canadian Intellectual Property Office, Office Action in Canadian Patent Application No. 2,776,686 mailed Jul. 21, 2015.
International Search Report and Written Opinion issued in corresponding International Patent Application No. PCT/US2009/060346, issued Dec. 10, 2009, 6 pages.
International Bureau of WIPO, International Search Report for Application No. PCT/US2009/060347, mailed Dec. 11, 2009.

(Continued)

*Primary Examiner* — Matthew G Katcoff
(74) *Attorney, Agent, or Firm* — Lorenz & Kopf, LLP

(57) ABSTRACT

A tree harvester is disclosed that includes first and second hydraulic pumps for powering a harvesting head of the tree harvester.

7 Claims, 5 Drawing Sheets

(56) References Cited

OTHER PUBLICATIONS

International Bureau of WIPO, Written Opinion of the International Searching Authority for Application No. PCT/US2009/060347, mailed Dec. 11, 2009.
International Bureau of WIPO, International Preliminary Report on Patentability for Application No. PCT/US2009/060347, mailed Dec. 11, 2009.
Canadian Intellectual Property Office, Office Action for Canadian Application No. 2,776,809, dated Jul. 27, 2015.
Canadian Intellectual Property Office, Office Action for Canadian Application No. 2,776,809, dated Apr. 22, 2016.

\* cited by examiner

LOAD SENSE HYDRAULIC PUMP ALIGNMENT

CROSS-REFERENCE TO RELATED APPLICATIONS

This application is a nationalization of PCT Patent Application Serial No. PCT/US2009/60346, filed Oct. 12, 2009, the disclosure of which is expressly incorporated herein by reference.

FIELD OF THE INVENTION

The present disclosure relates to forestry equipment. More particularly, the present disclosure relates to a system for managing pumps used to power hydraulic units on forestry equipment.

BACKGROUND OF THE INVENTION

Forestry equipment is used to fell trees during harvesting. One type of forestry equipment is a tracked harvester that includes a harvesting head the grasps a tree to be felled, downs the tree with a chain saw, and cuts the felled tree trunks to length with the chain saw. The hydraulic components of the harvesting head are powered by one or more hydraulic pumps.

SUMMARY

According to one embodiment of the present invention, a tree harvester is provided that includes a chassis; at least one ground engaging mechanism configured to propel the chassis over the ground; a harvesting head including a saw configured to cut trees; a plurality of hydraulic units including a hydraulic motor to power the saw; and a hydraulic control system. The hydraulic control system includes a first hydraulic pump providing pressurized hydraulic fluid; a plurality of valves controlling the supply of hydraulic fluids from the first hydraulic pump to the plurality of hydraulic units; a load sense system that detects the load pressure requirements of the plurality of hydraulic units and provides instruction to the first hydraulic pump to produce pressure sufficient to satisfy the requirements of a highest of the load pressure requirements of the plurality of hydraulic units; and a second hydraulic pump providing hydraulic fluid to the harvesting head, the hydraulic motor providing a load sense signal to the load sense system to control operation of the first hydraulic pump and a load sense signal to the second hydraulic pump to control operation of the second hydraulic pump.

According to another aspect of the present invention, a method of harvesting trees including the steps of providing a tree harvester including a chassis, traction devices configured to propel the chassis, a plurality of hydraulic units, a harvester head having a saw and hydraulic motor configured to power the saw, and a hydraulic system configured to operate the plurality of hydraulic units and the hydraulic motor; sensing the maximum load pressure required of the plurality of hydraulic units and the harvester head; controlling a first hydraulic pump based on the sensed maximum load pressure; sensing the load pressure required by the harvester head; controlling a second hydraulic pump based on the sensed load pressure required by the harvester head; combining the output of the first and second hydraulic pumps to power the harvester head; and harvesting a tree using the saw.

BRIEF DESCRIPTION OF THE DRAWINGS

The above-mentioned and other features and advantages of this disclosure, and the manner of attaining them, will become more apparent and the disclosure itself will be better understood by reference to the following description of embodiments of the invention taken in conjunction with the accompanying drawings, wherein.

Corresponding reference characters indicate corresponding parts throughout the several views. The exemplifications set out herein illustrate exemplary embodiments of the invention and such exemplifications are not to be construed as limiting the scope of the invention in any manner.

DETAILED DESCRIPTION

Figure 1A:
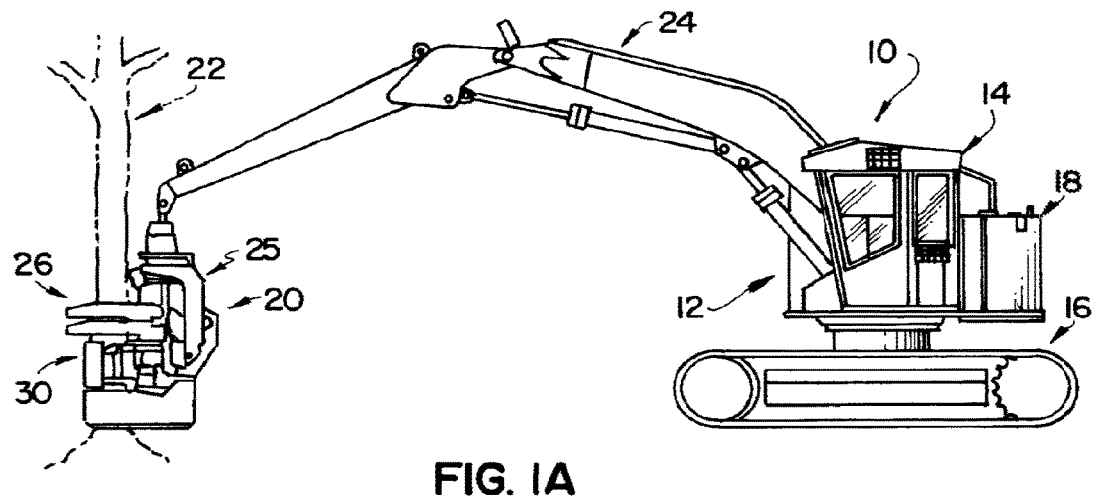
FIG. 1A is an elevational view of a tracked tree harvester showing the harvester including a chassis, a pair of tracks propelling the chassis, a boom, and a harvesting head supported by the boom.

Referring to FIG. 1, a tracked tree harvester 10 of the present embodiment illustratively includes a chassis 12 having a cab portion 14, a plurality of tracks 16 for supporting chassis 12 above the ground, an engine 18 for powering tracks 16 to propel chassis 12, and a harvesting head 20 for harvesting trees. Tracked harvester 10 also includes a linkage assembly or boom 24 that allows harvesting head 20 to be raised, lowered, and tilted to position harvesting head 20 at a desired position relative to a tree 22 to be felled. Although a tracked harvester is shown and described herein using tracks 16 as propulsion devices, harvesting head 20 may be provided on other types of tree harvesters, such as wheeled tree harvesters that use tracks as propulsion devices. Additional details of harvesters are provided in U.S. Pat. No. 4,412,569 and U.S. Patent Publication No. 2008/0289724, the entire disclosures of which are expressly incorporated by reference herein.

Figure 1B:
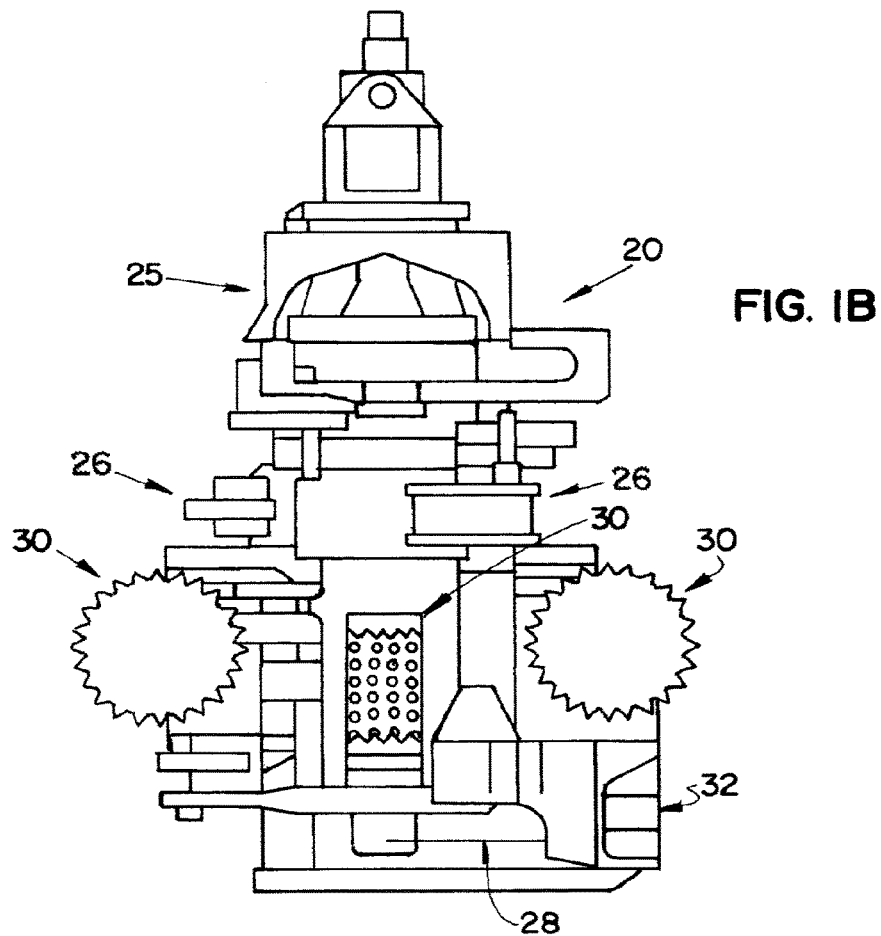
FIG. 1B is an enlarged, front elevational view of the harvesting head of FIG. 1A.

As shown in FIGS. 1A and 1B, harvesting head 20 includes a support frame 25 supported by boom 24, arms 26, and chain saw 28 powered by a hydraulic motor 32. Arms 26 grasp tree 22 while chain saw 28 cuts through tree 22. Harvesting head 20 further includes advancing wheels 30 that move cut tree 22 relative to head 20 to position chain saw 28 at locations to cut tree 22 into segments. Once tree 22 is segmented, arms 26 open to release the remaining portion of tree 22 still held by head 20. Chain saw 28 and wheels 30 are powered by hydraulic motors, such as motor 32, and arms 26 are powered by hydraulic cylinders (not shown). Additional details of suitable harvesting heads are provided in U.S. Pat. Nos. 4,881,582; 6,516,841; 6,691,751; 6,962,178; and 7,296,602, the entire disclosures of which are expressly incorporated by reference herein.

The hydraulic motors, such as motor 32, and hydraulic cylinders of harvesting head 20 and the other hydraulic units 56 of tracked harvester 10 are powered by a first hydraulic pump 50 as part of a hydraulic system 52. Harvesting head 20 is also powered by a second hydraulic pump 54 as part of hydraulic system 52. Hydraulic system 52 coordinates the supply of hydraulic fluid to harvesting head from first pump 50 and second pump 54 based on the load pressure requirements of harvesting head 20. All of the hydraulic fluid of second hydraulic pump 54 is provided to harvesting head 20. Whereas, the hydraulic fluid of first hydraulic pump 50 is split between harvesting head 20 and the other hydraulic components of tracked harvester 10.

Hydraulic system 52 is a load sense system that detects the highest pressure required by hydraulic system 52 and controls pump 50 to provide an output pressure sufficient to satisfy this highest required pressure. Hydraulic system 52 receives the load pressure requirement of each of a series of hydraulic units 56, such as a hydraulic cylinder used to power linkage assembly 24, and passes the highest pressure through main load sense line 57 to a pump control 58 for first pump 50. In response, pump 50 provides hydraulic fluid at a pressure sufficient to satisfy the highest pressure required. Similarly, hydraulic system 52 includes a pump control 60 for second pump 54 that controls the operation of second pump 54. Pump control 60 reacts to the load requirements of harvesting head 20 to provide hydraulic fluid to harvesting head 20 based on the needs of harvesting head 20.

Hydraulic system 52 further includes a series or stack of valve assemblies 61 that control the supply of hydraulic fluid to the respective hydraulic units 56. Each valve assembly 60 includes a selection valve 62 that controls the flow of fluid to a hydraulic unit 56 and a pressure compensator 64 to compensate for the high pressure output of pump 50 resulting from the input of load sense system 53. When a particular hydraulic unit 56 does not require the highest pressure provided by first pump 50, pressure compensator 62 reduces the supply pressure to the particular hydraulic unit 56. Additional details of a suitable load sense system are provided in U.S. Pat. No. 7,415,822, titled "Load Sense Boost Device," filed Jul. 21, 2005, to Harber et al. Although hydraulic units 56 are shown as hydraulic cylinders in FIG. 2, hydraulic units 56 may be other hydraulic units, such as hydraulic motors to drive tracks 16, and other hydraulically powered devices.

Figure 2:
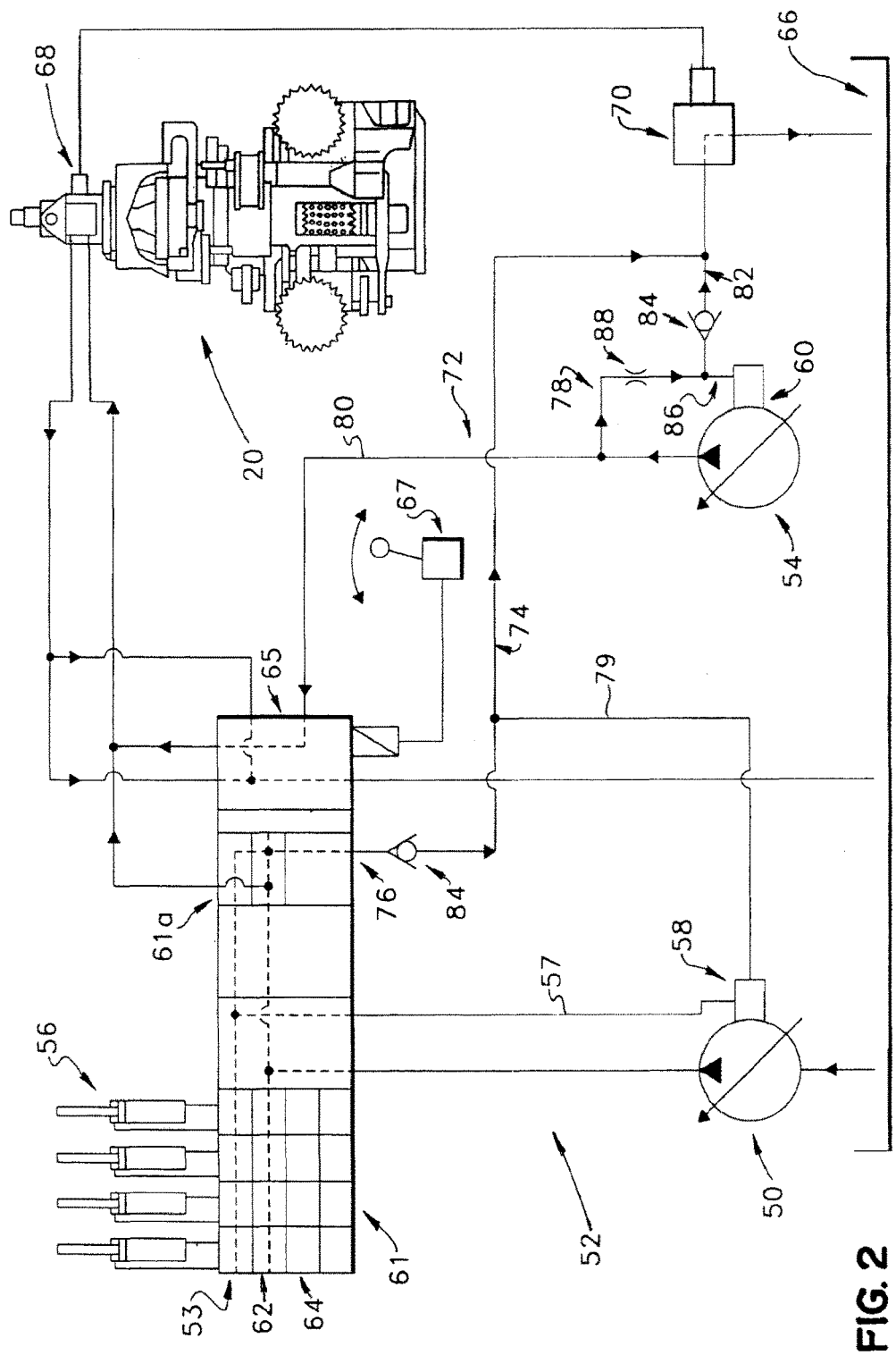
FIG. 2 is a schematic diagram illustrating an hydraulic system of the tracked harvester of FIG. 1.

As shown in FIG. 2, one of the valve assemblies, valve assembly 61a, controls the flow of hydraulic fluid from first pump 50 to harvesting head 20. Hydraulic system 52 also includes a saw on/off valve 65 that controls the flow of fluid through harvesting head 20 to start and stop chain saw 28 rotating for example. On/off valve 65 controls exhausting of hydraulic fluid from harvesting head 20 and the supply of hydraulic fluid from second pump 54. On/off valve 65 is a solenoid valve that receives an electronic signal to open when an operator decides to activate chain saw 28 by moving switch 67 to an on position. When open, valve 65 allows hydraulic fluid to exhaust from harvesting head 20 to tank 66. When closed, valve 65 blocks hydraulic fluid from exhausting to tank 66. As a result, no fluid flows through harvesting head 20 to rotate the bar of chain saw 28. Therefore, valve assembly 61a and on/off valve 65 cooperate to control harvesting head 20. Harvesting head 20 preferably includes one or more valves (not shown) that control the operation of the hydraulic features, such as retraction and extension of arms 26, rotation of the chain bar of chain saw 28, and the other hydraulic features of head 20. According to an alternative embodiment of the present disclosure, the features of valve assembly 61a and on/off valve 65 may be combined in a single valve or other device or otherwise divided among multiple valves or other devices.

The demand of harvesting head 20 is communicated to pump control 58 for first pump 50 and pump control 60 for second pump 54. As shown in FIG. 2, a pressure sensor 68 is provided on harvesting head 20 to detect the load sense pressure of harvesting head 20. This load sense pressure is then used to control the output of pumps 50, 54 to power harvesting head 20 and power rotation of the chain of chain saw 28 and the other hydraulic features of harvesting head 20.

As shown in FIG. 2, pressure sensor 68 is coupled to a proportional relief valve 70 that controls exhausting of fluid from hydraulic line network 72 to control the output of pumps 50, 54. Network 72 includes a primary line 74. Primary line 74 is coupled to saw valve assembly 61a at valve port 76 that continuously provides hydraulic fluid to primary line 74 whether or not instructions are provided to power harvesting head 20 and chain saw 28. When pressure sensor 68 detects no load or demand from harvesting head 20, it sends a low electrical current signal to proportional relief valve 70. In response, proportional relief valve 70 allows the hydraulic fluid provided to primary line 74 by valve assembly 61a to exhaust to tank 66. As a result, little or no pressure builds up in primary line 74.

When pressure sensor 68 detects some load or demand from harvesting head 20, it provides a higher electrical current to proportional relief valve 70. In response, proportional relief valve 70 restricts the flow of hydraulic fluid provided to primary line 74 by valve assembly 61a from exhausting to tank 66. As a result, pressure builds in primary line 74. As pressure sensor 68 detects a greater load or demand from harvesting head 20, proportional relief valve 70 further restricts the flow of hydraulic fluid to tank 66 and the pressure builds further. As pressure builds in primary line 74, pressure also builds at valve port 76 of valve assembly 61a. This pressure is fed into load sense system 53 of hydraulic system 52. If the load pressure of harvesting head 20 exceeds the load pressure of the other hydraulic units 56, this pressure is passed onto pump control 58 to control the output pressure of pump 50 at a level sufficient to satisfy the demand of harvesting head 20.

On occasion, pump 50 may require more power from engine 18 than engine 18 can provide in a satisfactory manner, which will cause engine 18 to stall. To avoid engine stall when harvesting head 20 is demanding more pressure than engine 18, through pump 50, can provide, network 72 includes a power feedback line 79 that provides direct feedback to pump control 58 that limits the torque requirements of pump 50 to avoid engine stall.

Network 72 further includes secondary line 78 coupled to output line 80 from second pump 54. Second pump 54 continuously provides hydraulic fluid at a load sense pressure to output line 80 whether or not instructions are provided to power harvesting head 20 and chain saw 28. Secondary line 78 includes first branch 82 that extends to proportional relief valve 70 and includes a check valve 84 blocking back flow of fluid from primary line 74. Secondary line 78 further includes a second branch 86 that extends to pump control 60 for second pump 54. As stated above, when pressure sensor 68 detects no load or demand from harvesting head 20, it sends a low electrical current signal to proportional relief valve 70. In response, proportional relief valve 70 allows the hydraulic fluid in first branch 82 of secondary line 78 to exhaust to tank 66. As a result, little or no pressure builds up in second branch 86 of secondary line 78 and little or no pressure is provided to pump control 60 so that pump 54 does not increase its output pressure above the load sense pressure mentioned above.

When pressure sensor 68 detects some load or demand from harvesting head 20, it provides a higher electrical current to proportional relief valve 70. In response, proportional relief valve 70 restricts the flow of hydraulic fluid from first branch 82 of secondary line 78 to tank 66. As a result, pressure builds in secondary line 78, including first and second branches 82, 86. As pressure sensor 68 detects a greater load or demand from harvesting head 20, proportional relief valve 70 further restricts the flow of hydraulic fluid to tank 66 from secondary line 78 and the pressure builds further. As pressure builds in second branch 86 of secondary line 78, pressure also builds at pump control 60 so that pump 54 increases its output pressure.

As pump 54 increases its output pressure, secondary line 78 communicates this pressure to pump control 60 through second branch 82 resulting in even greater pressure output from pump 54. Eventually, pump 54 either reaches its maximum output pressure or proportional relief valve 70 bleeds sufficient pressure from secondary line 78 to maintain the output of pump 54 at the desired pressure as determined by the output of pressure sensor 68.

To avoid rapid fluctuations in inputs to pump control 60, an orifice or flow restriction 88 is placed in secondary line 78. During initial ramp up of the output pressure of pump 54, orifice 88 provides a pressure drop to dampen the influence of the change in output pressure from pump 54.

Figure 3:
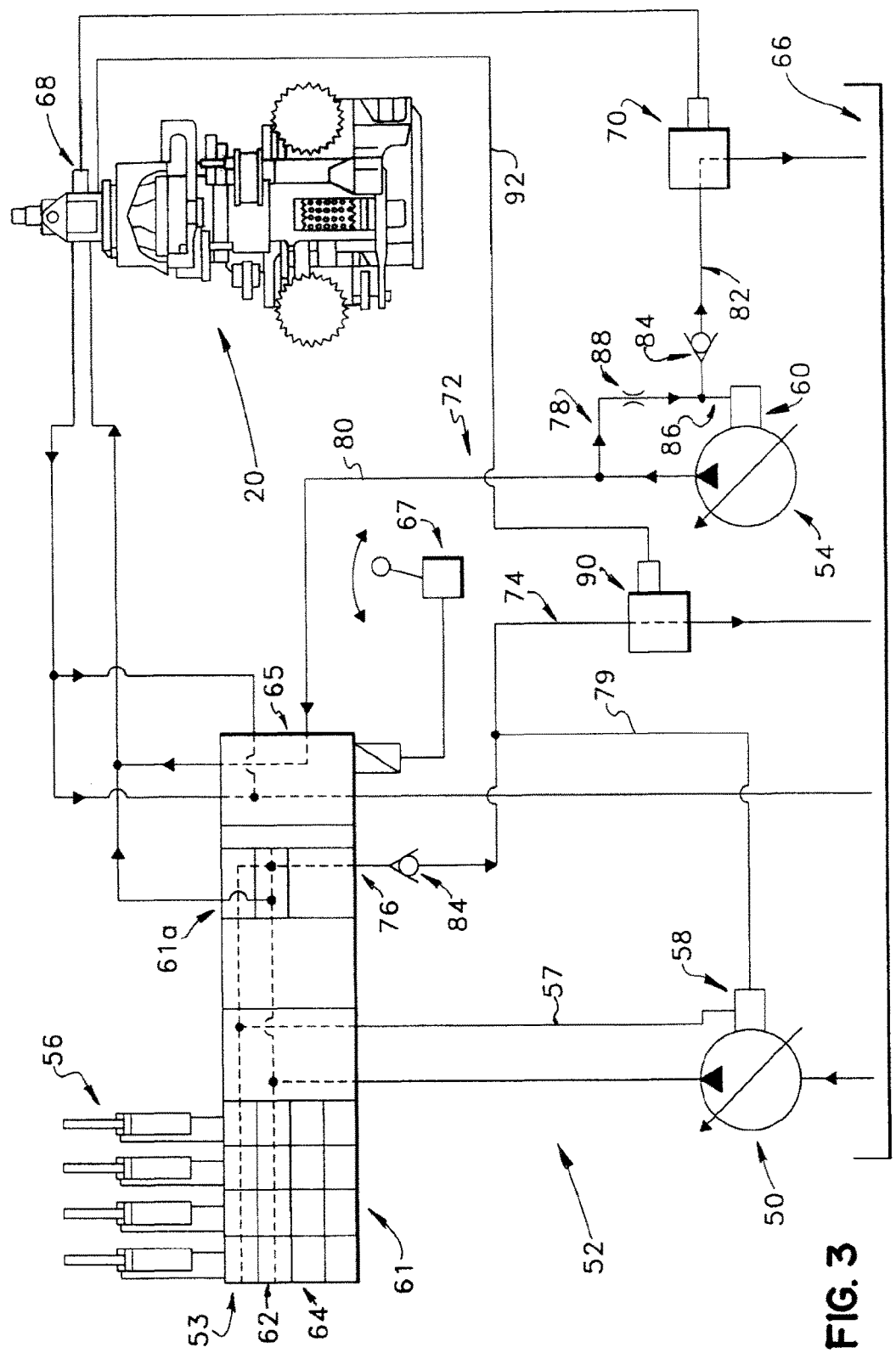
FIG. 3 is a schematic diagram illustrating an alternative embodiment hydraulic system for use with the tracked harvester of FIG. 1.

According to an alternative embodiment of the present disclosure shown in FIG. 3, proportional relief valve 70 for controlling pump 50 is replaced by a piloted sequence valve 90 and pressure sensor 68 for controlling pump 50 is replaced with a hydraulic line 92 extending from harvesting head 20 to piloted sequence valve 90. Primary line 74 provides continuous load sense pressure to piloted sequence valve 90 and load pressure from harvesting head 20 controls exhausting of this pressure to tank 66. As load pressure from harvesting head 20 increases, less pressure is exhausted to tank 66, which causes pressure in primary line 74 to increase. As discussed above, this pressure is fed into load sense system 53 of and potentially back to pump control 58 of pump 50 if the load pressure of harvesting head 20 is greater than the other load inputs to the load sense system. A similar piloted sequence valve arrangement can be provided to control the input to pump control 60 of pump 54 when pressure sensor 68 is not provided.

Figure 4:
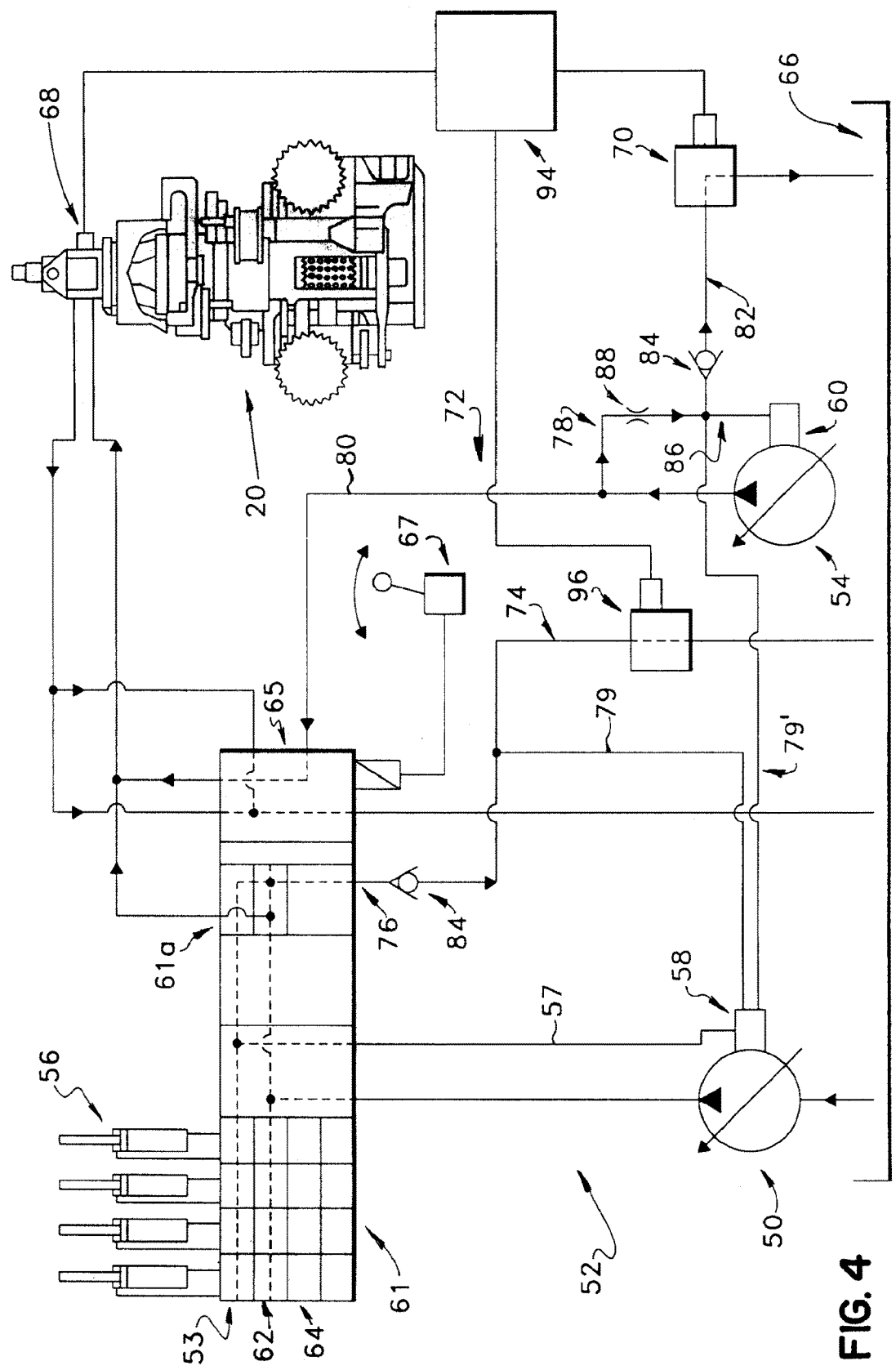
FIG. 4 is a schematic diagram illustrating another alternative embodiment hydraulic system for use with the tracked harvester of FIG. 1.

As shown in FIG. 4, according to another alternative embodiment, proportional relief valve 70 is provided to control second pump 54 as described above with the exception that a programmable logic controller (PLC) 94 is positioned between load sense pressure sensor 68 and proportional relief valve 70. Preferably, the output from PLC 94 to proportional relief valve 70 is proportional to the input to PLC 94 from pressure sensor 68. As shown in FIG. 4, PLC 94 also provides input to pressure relief valve 96 to control exhausting of load sense pressure from valve assembly 61a to tank 66. Thus, rather than one proportional relief valve 70 controlling the input to pumps 50, 54, two pressure relief valves 70, 96 are used to control the respective pumps 54, 50. With this configuration, pumps 54, 50 can be controlled independently through the logic of PLC 94. Power feedback line 79 provides feedback to pump control 58 that limits the torque requirements of pump 50 to avoid engine stall. An alternative power feedback line 79' may also be provided.

Figure 5:
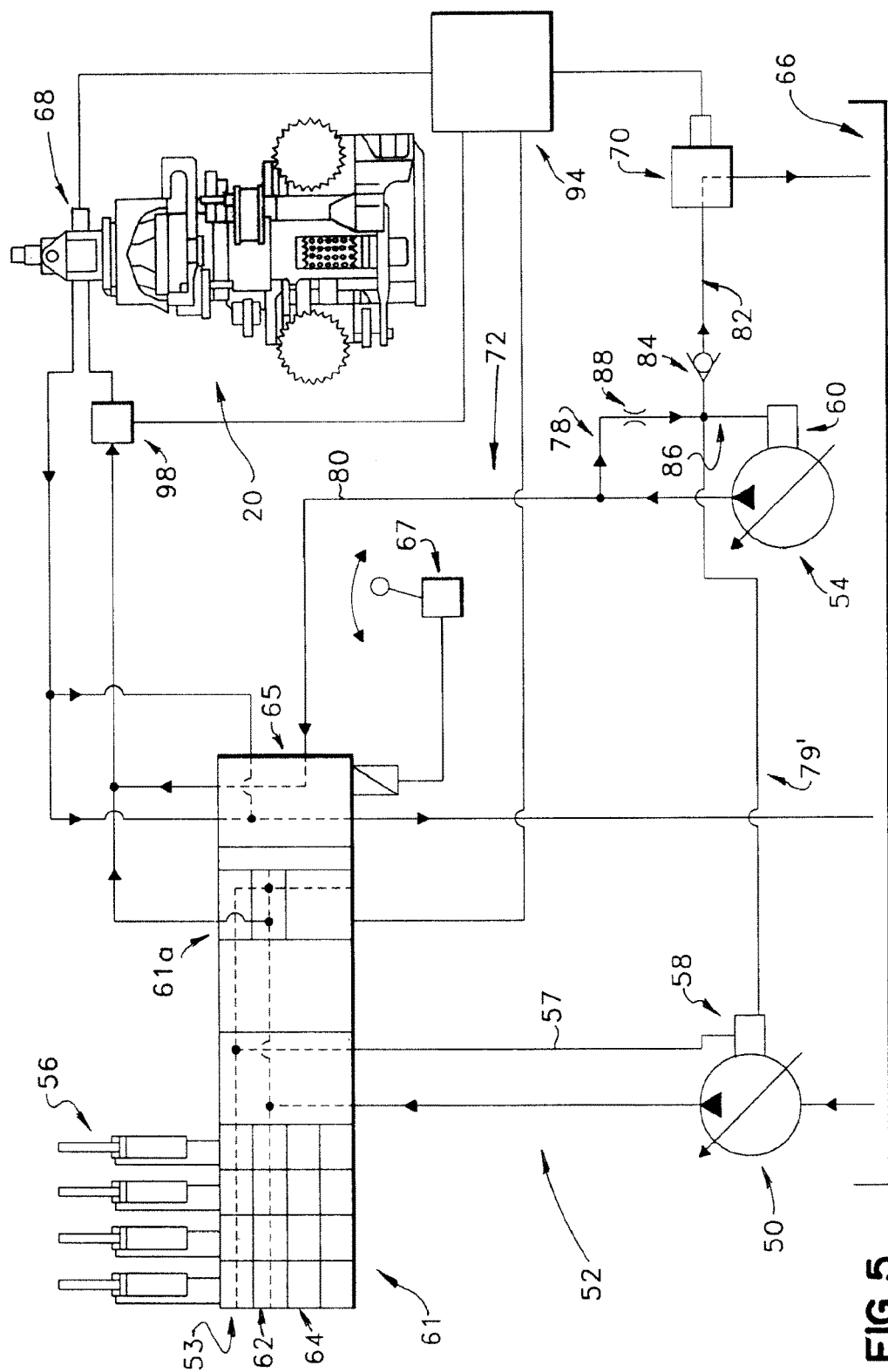
FIG. 5 is a schematic diagram illustrating another alternative embodiment hydraulic system for use with the tracked harvester of FIG. 1.

Another alternative embodiment control arrangement is provided in FIG. 5. Compared to the embodiment of FIG. 4, valve assembly 61a is directly controlled with an electronic signal from PLC 94 and a supply pressure sensor 98 is provided. The output from PLC 94 to proportional relief valve 70 remains proportional to the load sense output from pressure sensor 68. The output from PLC 94 is proportional to the supply pressure provided by pressure sensor 98 less the load sense pressure provided by pressure sensor 68.

While this invention has been described as having preferred designs, the present invention can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this invention pertains and which fall within the limits of the appended claims.

The invention claimed is:

1. A hydraulic system for a tree harvester having a chassis and a harvester head configured to cut trees, the hydraulic system comprising:
   a plurality of hydraulic units including a main hydraulic unit associated with the chassis and a head hydraulic unit associated with the harvester head;
   a valve unit having a plurality of valve sections for controlling the plurality of hydraulic units;
   a head pump providing pressurized hydraulic fluid exclusively to the head hydraulic unit via a head valve section of the valve unit;
   a main pump providing pressurized hydraulic fluid to the main hydraulic unit via a main valve section of the valve unit and providing supplemental pressurized hydraulic fluid to the head hydraulic unit via the head valve section only when load requirements of the head hydraulic unit exceed a power provided by the head pump;
   a load sense system that detects the load requirements of the plurality of hydraulic units and provides a load sense signal via a load sense line for the main pump to produce pressure sufficient to satisfy the requirements of a highest of the load requirements of the plurality of hydraulic units; and
   a pressure control device that is disposed between the valve unit and a tank;
   wherein, when the load requirements of the head hydraulic unit exceed the pressurized hydraulic fluid provided by the head pump, the main pump provides the supplemental pressurized hydraulic fluid to the head value section to increase pressurized hydraulic fluid supply at a pressure sufficient to meet the load requirements of the head hydraulic unit; and
   wherein an output pressure of the head valve section is limited to the pressure sufficient to meet the load requirements of the head hydraulic unit by the pressure control device discharging pressurized hydraulic fluid from the load sense line to the tank to modify the load sense signal such that, when supplementing the head pump, the main pump operates below maximum pressure unless required to meet the load requirements of the head hydraulic unit.

2. The hydraulic system of claim 1, further including a load pressure sensor coupled to the head hydraulic unit to provide a load pressure signal.

3. The hydraulic system of claim 2, wherein the pressure control device is a relief valve coupled directly to a valve port of the head valve section via a primary line; and
   wherein the relief valve relieves the output pressure of the head valve section by discharging pressurized hydraulic fluid in the primary line to the tank based on the load pressure signal from the load pressure sensor.

4. The hydraulic system of claim 3, further including a head relief valve disposed between the load pressure sensor and the head pump to control discharging pressurized fluid from the head pump to the tank based on the load pressure signal from the load pressure sensor.

5. The hydraulic system of claim 4, wherein the pressure control device is a main relief valve coupled directly to a valve port of the head valve section via a primary line and coupled to the head hydraulic unit via a secondary line; and wherein the main relief valve relieves the output pressure of the head valve section by discharging pressurized hydraulic fluid from the primary line to the tank based on a load pressure signal received from the head hydraulic unit via the secondary line.

6. The hydraulic system of claim 4, further including a controller receiving the load pressure signal from the load pressure sensor;

wherein the pressure control device is a main relief valve coupled to the head valve section and coupled via the controller to the head hydraulic unit; and wherein the main relief valve relieves the output pressure of the head valve section by discharging pressurized hydraulic fluid to the tank in response to a control signal from the controller based on the load pressure signal received from the load pressure sensor.

7. The hydraulic system of claim 2, further including:

a supply pressure sensor coupled to an output port of the head valve section and providing a supply pressure signal; and a controller receiving the load pressure signal from the load pressure sensor and the supply pressure signal from the supply pressure sensor;

wherein the pressure control device is a relief valve coupled to the head valve section via the controller; and wherein the controller controls the relief valve to relieve the output pressure of the head valve section by discharging pressurized hydraulic fluid to the tank based on the load pressure signal and the supply pressure signal.

* * * * *